United States Patent
Shi et al.

(10) Patent No.: US 12,380,057 B2
(45) Date of Patent: Aug. 5, 2025

(54) IMPROVING COMPUTING EFFICIENCY OF A PROCESSOR BY OPTIMIZING A COMPUTATIONAL SIZE OF EACH COMPUTING CORE IN THE PROCESSOR

(71) Applicant: Beijing Zitiao Network Technology Co., Ltd., Beijing (CN)

(72) Inventors: Yunfeng Shi, Beijing (CN); Hangjian Yuan, Beijing (CN); Tao Li, Beijing (CN); Jing Xing, Beijing (CN); Jian Wang, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/896,789

(22) Filed: Sep. 25, 2024

(65) Prior Publication Data
US 2025/0103549 A1  Mar. 27, 2025

(30) Foreign Application Priority Data
Sep. 27, 2023 (CN) .......................... 202311259402.9

(51) Int. Cl.
*G06F 15/78* (2006.01)
*G06F 9/50* (2006.01)

(52) U.S. Cl.
CPC ........ *G06F 15/7867* (2013.01); *G06F 9/5044* (2013.01); *G06F 9/505* (2013.01); *G06F 9/5077* (2013.01); *G06F 9/5083* (2013.01)

(58) Field of Classification Search
CPC .... G06F 15/7867; G06F 9/5044; G06F 9/505; G06F 9/5077; G06F 9/5083
See application file for complete search history.

(56) References Cited

U.S. PATENT DOCUMENTS

| | | | | |
|---|---|---|---|---|
| 7,730,119 B2* | 6/2010 | Bates | ..................... | G06F 9/5044 |
| | | | | 709/201 |
| 11,309,061 B1* | 4/2022 | Haseeb | ................... | G16B 40/10 |

(Continued)

FOREIGN PATENT DOCUMENTS

| | | |
|---|---|---|
| CN | 110689115 A | 1/2020 |
| CN | 114611675 A | 6/2022 |

(Continued)

OTHER PUBLICATIONS

"Auto-Tune with Templates and AutoTVM"; https://tvm.apache.org/docs/how to/tune with autotym/index.html; TVM—Apache; © 2024; accessed Sep. 27, 2024; 2 pages.

(Continued)

*Primary Examiner* — Shawn Doman
(74) *Attorney, Agent, or Firm* — BakerHostetler

(57) ABSTRACT

Techniques for improving computing efficiency of a processor by optimizing a computational size of each computing core in the processor are provided. The techniques include obtaining a configuration space for a target parameter; obtaining a computational time model of the processor, the computational time model is a function of the target parameter and a number of computing cores of the processor; traversing the target parameter in the configuration space, and calculating, based on the computational time model, a computational time corresponding to the target parameter that is selected; in response to the target parameter being a k-th parameter with a minimum computational time, determining the target parameter as the k-th parameter; and improving the computing efficiency of the processor by configuring the computational size of each computing core in the processor based on the k-th parameter.

19 Claims, 9 Drawing Sheets

(56) References Cited

U.S. PATENT DOCUMENTS

| | | | |
|---|---|---|---|
| 2006/0206900 A1* | 9/2006 | Ooyama | G06F 9/5083 |
| | | | 718/105 |
| 2015/0339162 A1* | 11/2015 | Kose | G06F 13/00 |
| | | | 718/105 |
| 2017/0017521 A1* | 1/2017 | Gupta | G06F 9/5016 |
| 2018/0349159 A1* | 12/2018 | Boutnaru | H04L 67/101 |
| 2019/0266015 A1* | 8/2019 | Chandra | G06F 9/505 |
| 2020/0042362 A1* | 2/2020 | Cui | G06V 10/82 |
| 2021/0191733 A1* | 6/2021 | Gunnam | G06F 18/24 |
| 2022/0391665 A1 | 12/2022 | Zhang et al. | |
| 2023/0195537 A1* | 6/2023 | Wang | G06F 9/5083 |
| | | | 718/105 |
| 2023/0237125 A1 | 7/2023 | Yang et al. | |
| 2023/0273832 A1* | 8/2023 | Paul | G06F 1/324 |
| 2023/0367640 A1* | 11/2023 | Chofleming, Jr. | G06F 9/5044 |
| 2023/0376347 A1* | 11/2023 | Liu | G06F 9/505 |
| 2024/0378084 A1* | 11/2024 | Rosemarine | G06F 9/5027 |

FOREIGN PATENT DOCUMENTS

| | | |
|---|---|---|
| CN | 114995822 A | 9/2022 |
| CN | 115516425 A | 12/2022 |
| CN | 115904539 A | 4/2023 |
| CN | 116663618 A | 8/2023 |
| WO | WO 2022/235251 A1 | 11/2022 |

OTHER PUBLICATIONS

International Patent Application No. PCT/CN2024/121108; Int'l Search Report and Written Opinion; dated Jan. 8, 2025; 16 pages.

European Patent Application No. 24203349.6; Extended Search Report; dated Mar. 3, 2025; 11 pages.

\* cited by examiner

IMPROVING COMPUTING EFFICIENCY OF A PROCESSOR BY OPTIMIZING A COMPUTATIONAL SIZE OF EACH COMPUTING CORE IN THE PROCESSOR

CROSS-REFERENCE TO RELATED APPLICATION

The present application claims priority of the Chinese Patent Application No. 202311259402.9, filed on Sep. 27, 2023, the disclosure of which is incorporated herein by reference in its entirety.

TECHNICAL FIELD

The embodiments of the present disclosure relate to a data processing method, a data processing apparatus, a processor, an electronic device and a storage medium.

BACKGROUND

A large amount of parallel computing is involved in the field of artificial intelligence (AI) deep learning. A vector processor is a Central Processing Unit (CPU) that can directly operating one-dimensional arrays or vector instruction sets and can handle complex parallel computing tasks. For example, a vector processor can decompose a complex computing task into a plurality of smaller subtasks that can run simultaneously and independently, thereby improving task execution efficiency and increase computing speed significantly. Compared to a scalar processor that can only process one piece of data at a time, a vector processor can greatly improve performance in specific working environments, especially in areas that require a lot of parallel computing, such as artificial intelligence.

SUMMARY

At least one embodiment of the present disclosure provides a data processing method for a processor, and the processor includes at least one computing core. The data processing method includes: obtaining a configuration space for a target parameter, the configuration space includes a first parameter to an n-th parameter, and n is an integer greater than 1; obtaining a computational time model of the processor, the computational time model is a function of the target parameter and number of computing cores of the processor; traversing the target parameter in the configuration space, and calculating, based on the computational time model, a computational time corresponding to the target parameter that is selected; in response to the target parameter being a k-th parameter with a minimum computational time, determining the target parameter as the k-th parameter, k is a positive integer smaller than or equal to n; and using the k-th parameter to configure a computational size of each computing core in the at least one computing core.

At least one embodiment of the present disclosure further provides a data processing apparatus for a processor, and the processor includes at least one computing core. The data processing apparatus includes: an obtaining module, configured to obtain a configuration space for a target parameter, the configuration space includes a first parameter to an n-th parameter, and n is an integer greater than 1; the obtaining module is further configured to obtain a computational time model of the processor, the computational time model is a function of the target parameter and number of computing cores of the processor; a computation module, configured to traverse the target parameter in the configuration space, and, calculate, based on the computational time model, a computational time corresponding to the target parameter that is selected; a determining module, configured to, in response to the target parameter being a k-th parameter with a minimum computational time, determine the target parameter as the k-th parameter, k is a positive integer smaller than or equal to n; and a parameter using module, configured to use the k-th parameter to configure a computational size of each computing core in the at least one computing core.

At least one embodiment of the present disclosure further provides a processor, which includes at least one computing core, and the data processing apparatus provided by any one of the embodiments of the present disclosure.

At least one embodiment of the present disclosure further provides an electronic device, which includes: a processor; and a memory including one or more computer program modules, the one or more computer program modules are stored in the memory and configured to be executed by the processor, and the one or more computer program modules are configured to implement the data processing method provided by any one of the embodiments of the present disclosure.

At least one embodiment of the present disclosure further provides a storage medium, on which non-transitory computer-readable instructions are stored, the non-transitory computer-readable instructions, when executed by a computer, implement the data processing method provided by any one of the embodiments of the present disclosure.

BRIEF DESCRIPTION OF DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

FIG. 6 is a schematic diagram of an example of a calculation mode of a bandwidth bound type provided by at least one embodiment of the present disclosure;

FIG. 7 is a schematic diagram of an example of converting from a computing bound to a bandwidth bound provided by at least one embodiment of the present disclosure;

DETAILED DESCRIPTION

Figure 1:
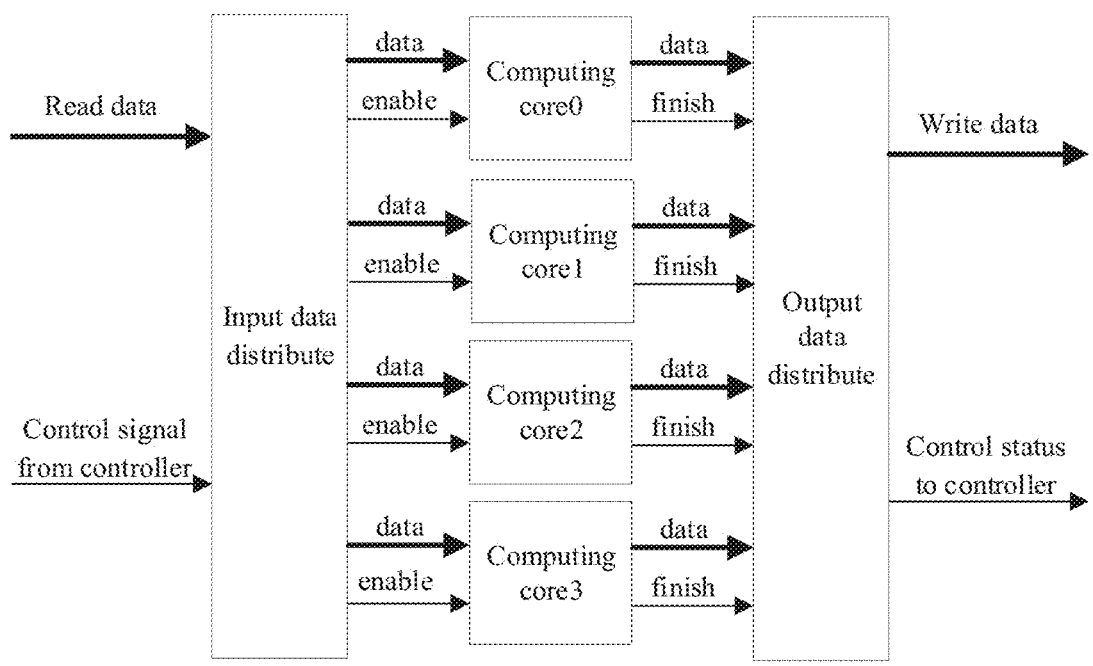
FIG. 1 is a schematic diagram of an example of an AI vector processor.

In order to make objects, technical details and advantages of the embodiments of the invention apparent, the technical solutions of the embodiments will be described in a clearly and fully understandable way in connection with the drawings related to the embodiments of the invention. Apparently, the described embodiments are just a part but not all of the embodiments of the invention. Based on the described embodiments herein, those skilled in the art can obtain other embodiment(s), without any inventive work, which should be within the scope of the invention.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. The terms "comprise," "comprising," "include," "including," etc., are intended to specify that the elements or the objects stated before these terms encompass the elements, the objects or equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

The present disclosure is described below through several specific embodiments. To keep the following description of the embodiments of the present disclosure clear and concise, detailed descriptions of well-known functions and well-known components may be omitted. When any component of an embodiment of the present disclosure appears in more than one drawing, the component is denoted by the same reference numeral in each drawing.

In deep learning operators and typical models, most of the AI vector computations are parallelizable AI vector calculations. For this kind of computing mode, a processor with a unique structure needs to be designed to handle these vector computing requirements. However, a standard linear processor only operates a single data set, and a conventional multi-core processor simply uses multiple linear processors to perform parallel computations simultaneously. Unlike the conventional multi-core processor, a vector processor can compute a single instruction on a one-dimensional array dataset or vector instruction set, so that the vector processor can be specifically designed according to the computation mode of AI vectors in deep learning to adapt to a large number of parallel AI vector computations.

FIG. 1 is a schematic diagram of an example of an AI vector processor.

For example, as shown in FIG. 1, the AI vector processor includes 4 computing cores (also known as vector processing units). For example, an external storage apparatus may be accessed serially by the four computing cores: the vector processor reads data to be processed from the external storage apparatus, and evenly distributes the data to the four computing cores through an input data distribution unit; further, in response to a control signal obtained from a controller being changed into an "enable" status, the four computing cores execute the computation in parallel; further, in response to the control signal obtained from the controller being changed into a "finish" status, the data obtained from the computation is integrated through an output data distribution unit, and then the processed data is output to the external storage apparatus, while the control status is fed back to the controller.

For example, each computing core allows for multiple (for example, 32, 64, or the like) parallel processing of a specific data type (for example, int8, fp64, fp32, fp16, or the like), and each computing core has independent and limited storage resources. Due to the limited storage resources inside each computing core and the need for parallel execution of computation and memory-access, a vector processor can be configured to perform multiple rounds of computation to complete a complex computing task. For example, the number of the rounds of computation performed by each computing core can be referred to as the number of cycles.

For example, a deep learning network contains many operators, such as "elew", "activation", and "normalize", etc. These operators include one or more input tensors and one or more output tensors, where the input tensors are configured to input to one or more computing cores, and the output tensors are configured to output from one or more computing cores. As an example, an operator "elew" has two input tensors and one output tensor. For example, each tensor has a specific dimension, and the dimension of each tensor determines the total computational size of the vector processor.

For example, different kinds of computations can be performed in each operator, and the operators are divided into compute-bound operators and memory-bound operators based on the number of computation operations and the number of memory-access operations. For example, the ADD (addition) mode of the operator "elew" has a ratio of computation to memory-access of 1:3, which accounts for a large proportion of memory-access, making it a memory-bound operator. The LOGIC_EQ (logical equality) mode of the operator "elew" has a ratio of computation to memory-access of 5:1, making it a compute-bound operator. For example, the bound type of the memory-bound operator is a bandwidth bound, and the bound type of the compute-bound operator is a computing bound.

Figure 2:
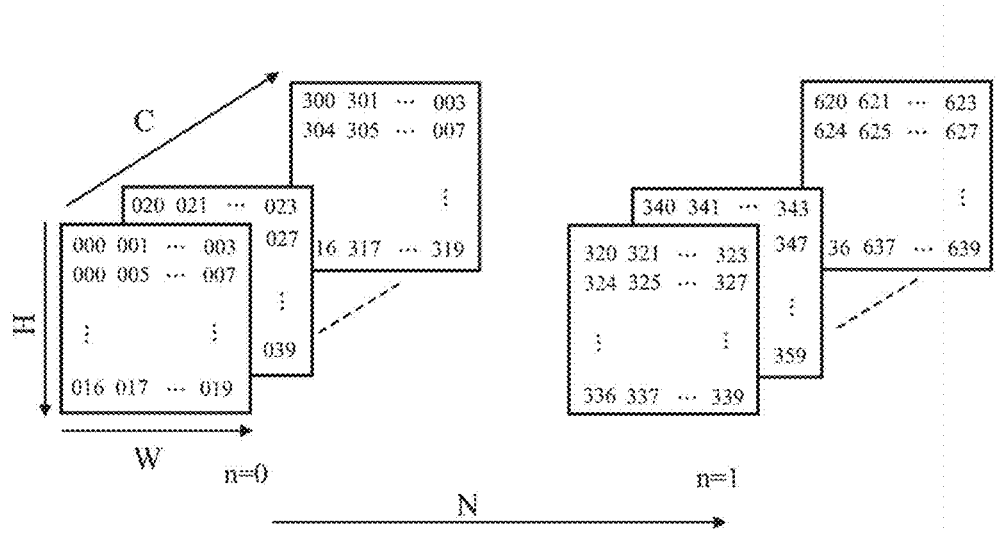
FIG. 2 is a schematic diagram of an example of tensor dimensions.

FIG. 2 is a schematic diagram of an example of tensor dimensions.

For example, as shown in FIG. 2, a dimension form of a tensor may be [N,H,W,C], and each tensor includes at least one batch, and N represents the number of batches; the data corresponding to each batch includes multiple channels; and C represents the number of channels. For example, in each channel, multiple data elements are arranged in two dimensions to form an array, and the height of the data in each channel in the vertical dimension is H, where H represents the number of data elements in the array along the column direction; and the width of the data in each channel in the horizontal dimension is W, where W represents the number of data elements in the row direction of the array.

For example, the tensors in FIG. 2 include 2 batches, that is, the number of batches N=2; each batch includes 16 channels, that is, the number of channels in each batch C=16; the number of data elements of data element arrays in each channel in the column direction is 5, that is, the height H=5, and the number of data elements of data element arrays in each channel in the row direction is 4, that is, the width W=4.

For example, tensors in different neural networks have different dimensional forms. In other words, when processing data, a memory is read and written in different orders according to the dimensions of the tensors. For example, dimension forms may also include [N,C,H,W] as well as some proprietary dimension forms (for example, [N,C,H,W,C']) and so on.

For example, for the dimensional form [N,H,W,C], since channel C is not split into multiple computing cores of the vector processor, the smallest unit of the computational size of each computing core (i.e., single-core computational size) is the channel C.

For example, for a vector processor that performs multiple rounds of computation, the computational size of the vector processor is related to the number of computing cores, the number of cycles, and the computational size of each computing core. For example, when data to be processed is evenly distributed across multiple computing cores, for each tensor, the computational size of the vector processor may be expressed by the following equation (1):

$$\text{tensor computational size} = \text{number of cycles} * \text{single-core computational size} * \text{number of computing cores} \quad (1)$$

For example, the "tensor computational size" of the vector processor is determined by the dimension of each tensor. When the tensor computational size and the number of computing cores are determined, it is necessary to reasonably set the relevant parameters such as "single-core computational size" and "number of cycles" to improve the computational efficiency and shorten the total computational time.

Figure 3:
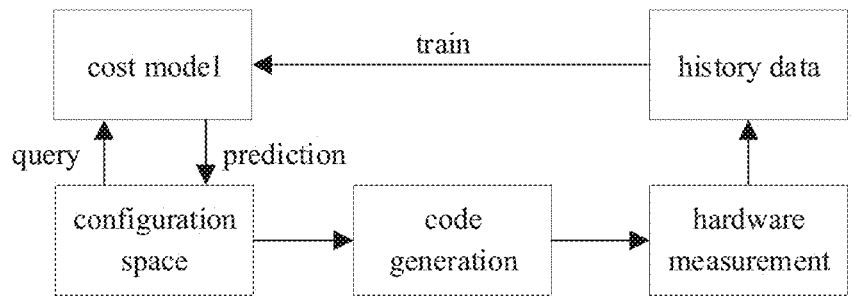
FIG. 3 is a schematic diagram of an example of a parameter tuning method.

FIG. 3 is a schematic diagram of an example of a parameter tuning method.

For example, a parameter to be optimized may be the single-core computational size or the number of cycles, etc., in the above equation (1). For example, as shown in FIG. 3, in order to maximize the use of hardware resources, a multi-dimensional configuration space may be set for the parameter to be optimized. The configuration space may be based on a parameter value range set based on empirical values or the like. For example, in the process of parameter tuning, sampling is firstly performed in the configuration space, and then the performance of the sampled parameter is queried from a cost model for prediction. The higher the prediction score, the better the performance on hardware using this parameter. Furthermore, the sampled parameter is used for code generation to be tested on the hardware. Furthermore, based on historical data such as hardware running speed and total computing time, etc., that is obtained after hardware measurement, the current cost model is trained to make more accurate predictions.

For example, in the parameter tuning solution as shown in FIG. 3, each selected parameter needs to be run on real hardware to obtain results such as hardware running speed and total computing time, etc., and then the optimal parameters can be selected by comparing the results obtained each time, which increases the complexity and compilation time of a compilation model and greatly reduces the computing efficiency.

For example, in another solution, taking a tensor in the form of a dimension [N,H,W,C] as an example (the tensor computational size is N*H*W*C), parameters in the following two extreme case may be selected:

1. The "single-core computational size" is selected as the smallest unit C of the computational size of each computing core, and based on the equation (1), the "number of cycles" may be obtained as "N*H*W/number of computing cores", but if the "single-core computational size" and "number of cycles" are selected according to this case, the parallelism of each computing core is very small, so that the resources of each computing core cannot be fully utilized.

2. If the minimum number of cycles of 1 is select for the "number of cycles", the "single-core computational size" may be obtained as (N*H*W/number of computing cores) *C" based on the equation (1). However, if the "single-core computational size" and the "number of cycles" are selected according to this case, the number of cycles cannot be fully utilized, and the single-core load may significantly exceed the resource limit.

For example, in another solution, a comparative empirical value may be selected as a parameter to be used based on a model used by the vector processor. However, if the comparative empirical value is used for an unused operator or data type, it is impossible to predict whether a high computational efficiency is achieved and whether the total computational time is minimized. In other words, the solution that selects the comparative empirical value cannot meet all the computational sizes, so it cannot take full advantage of the performance of the AI vector processor.

At least one embodiment of the present disclosure provides a data processing method for a processor, and the processor includes at least one computing core. The data processing method includes: obtaining a configuration space for a target parameter, the configuration space includes a first parameter to an n-th parameter, and n is an integer greater than 1; obtaining a computational time model of the processor, the computational time model is a function of the target parameter and number of computing cores of the processor; traversing the target parameter in the configuration space, and calculating, based on the computational time model, a computational time corresponding to the target parameter that is selected; in response to the target parameter being a k-th parameter with a minimum computational time, determining the target parameter as the k-th parameter, k is a positive integer smaller than or equal to n; and using the k-th parameter to configure a computational size of each computing core in the at least one computing core.

At least one embodiment of the present disclosure further provides a data processing apparatus for a processor, a processor, an electronic device and a storage medium.

The method, apparatus, processor, device and storage medium provided by at least one embodiment of the present disclosure establish an accurate computational time model based on the structure of the processor, and obtain an optimal single-core computational size according to the computational time model, without running on real hardware, thereby making full use of the processor performance, greatly improving the computing efficiency, and being applicable to different processor computing modes and different types of operators.

The following describes at least one embodiment of the present disclosure in detail with reference to the drawings.

It should be noted that similar numerals in the drawings refer to similar components that are described.

Figure 4:
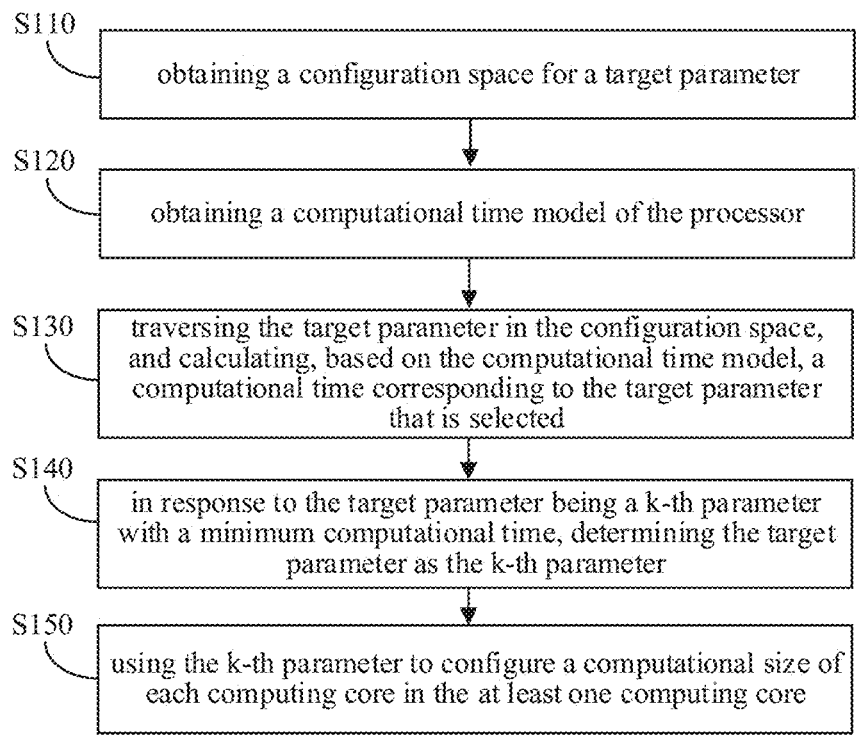
FIG. 4 is an exemplary flow chart of a data processing method for a processor provided by at least one embodiment of the present disclosure.

FIG. 4 is an exemplary flow chart of a data processing method for a processor provided by at least one embodiment of the present disclosure.

For example, as shown in FIG. 4, at least one embodiment provides a data processing method for a processor. For example, the data processing method includes the following steps S110 to S140:

- step S110: obtaining a configuration space for a target parameter;
- step S120: obtaining a computational time model of the processor;
- step S130: traversing the target parameter in the configuration space, and calculating, based on the computational time model, a computational time corresponding to the target parameter that is selected;
- step S140: in response to the target parameter being a k-th parameter with a minimum computational time, determining the target parameter as the k-th parameter; and
- step S150: using the k-th parameter to configure a computational size of each computing core in the at least one computing core.

For example, the processor provided by at least one embodiment of the present disclosure includes one or more computing cores, the processor may be an AI vector processor as shown in FIG. 3, or a processor of another structure or type selected according to actual needs, which are not limited in the embodiments of the present disclosure.

It should be noted that the computing cores provided by at least one embodiment of the present disclosure represent processing units that actually participate in calculations in the processor, and the total number of processing units that are included in the processor is greater than or equal to the number of computing cores that are actually participate in the calculations.

In some examples, the data to be processed is evenly distributed across the computing cores, and each computing core performs the same number of computational tasks. It should be noted that the number of computing cores is not limited to four as shown in FIG. 3, and may be selected according to actual needs, and the number, structure, and arrangement form, etc., of computing cores in the processor are not limited in the embodiments of the present disclosure.

For example, in step S110, the target parameter is used to represent the computational size of each computing core (i.e., single-core computational size). For example, the configuration space of the target parameter includes a first parameter to an n-th parameter, and the first parameter to the n-th parameter may be n parameters in a value range of the target parameter, where n is an integer greater than 1. For example, for a tensor with a dimensional form [N,H,W,C] (the smallest unit of the computational size is the channel C), if the target parameter represents the number of channels that are processed by each computing core, then the value range of the target parameter is 1 to (N*H*W/number of computing cores), and the first parameter to the n-th parameter are n parameters in a range of 1 to (N*H*W/number of computing cores).

For example, in step S120, the computational time model of the processor is a function of the target parameter and the number of computing cores of the processor. For example, the computational time model is used to represent the relationship between a total computational time of the processor and the target parameter. For an AI vector processor with a specific structure, a computational time model may be built based on the specific structure of the processor (e.g., number of computing cores, or the like).

For example, in step S130, in the process of traversing the target parameter in the configuration space, each parameter in the configuration space is selected as the target parameter, and the total computational time of the processor, which is obtained by the selected target parameter, is calculated by using the computational time model to find the minimum computational time from a plurality of computational results.

It should be noted that after all parameters from the first parameter to the n-th parameters are traversed, the minimum computational time may be found from the n computational results, or only a part of parameters in the configuration space may be traversed, and the minimum computational time may be found when a certain condition is satisfied, which are not limited in the embodiments of the present disclosure.

For example, in step S140, in the process of traversing the target parameter in the configuration space, when the target parameter is the k-th parameter, if a total computational time of the processor, which is obtained by calculating the k-th parameter using the computational time model, is the smallest, the target parameter is determined as the k-th parameter.

For example, in step S150, after the target parameter is determined as the k-th parameter, the k-th parameter is used to configure the computational size of each computing core (i.e., the target parameter). For example, taking a tensor in the dimensional form of [N,H,W,C] (the smallest unit of the computational size is the channel C) as an example, if the k-th parameter is equal to m (i.e., the determined target parameter is equal to m), each computing core of the processor is configured to process m channels.

In some examples, the "traversing target parameter in the configuration space" in step S130 may further include: traversing the target parameter in the configuration space in an order of the first parameter to the n-th parameter. For example, the first parameter is selected as the target parameter and the computational time model is used to calculate the computational time corresponding to the first parameter; then, the second parameter is selected as the target parameter and the computational time model is used to calculate the computational time corresponding to the second parameter, . . . until the k-th parameter is selected as the target parameter, that is, in step S140, if the computational time calculated by using the k-th parameter is the smallest, the target parameter is determined as the k-th parameter.

It should be noted that the target parameter may also be traversed in another order in the configuration space, which may be selected according to actual needs, and is not limited in the embodiments of the present disclosure.

In some examples, the computational time model is a Nike function for the target parameter. For example, in response to traversing the target parameter from the first parameter to the k-th parameter, a calculated computational time corresponding to the first parameter to the k-th parameter keeps decreasing; and in response to traversing the target parameter from the k-th parameter to the n-th parameter, a calculated computational time corresponding to the k-th parameter to the n-th parameter keeps increasing. For example, when the target parameter is traversed in the order of the first parameter to the n-th parameter in step S130, if the computational time is the smallest when traversing to the k-th parameter, the target parameter is determined as the k-th parameter in step S140.

In some examples, when traversing the target parameter in the order of the first to n-th parameters, the data processing method provided by at least one embodiment of the present disclosure may also include: in response to a computational size of the at least one computing core exceeding a resource bound threshold of the processor when the target parameter is traversed to a (k+1)-th parameter, determining the target parameter as the k-th parameter.

For example, when traversing the target parameter from the first parameter to the n-th parameter, the internal load on each computing core gradually increases. Due to limited storage resources within each computing core, as the load of a single core increases, the usage resources, storage resources, and the like of one or more computing cores in the processor may be exceeded, a critical point at which the resource limit is exceeded is referred to as a resource bound threshold. For example, when the target parameter is traversed to the (k+1)-th parameter, if the total computational size of the computing cores in the processor exceeds the resource bound threshold of the processor, then the k-th parameter, which not causes the computational size exceed the resource bound threshold, is determined as the target parameter, even if the calculated computational time corresponding to the k-th parameter is not reached the minimum value.

In some examples, the computational time model may be used for an operator that includes a plurality of tensors. For example, for tensors with the dimensional form of [N,H,W,C], each tensor includes at least one batch N, data corresponding to each batch includes at least one channel C, and dimensions of data corresponding to each channel include a first dimension and a second dimension. For example, the first dimension may be the height H of the data in each channel in the vertical dimension, and the second dimension may be the width W of the data in each channel in the horizontal dimension.

For example, for the tensor with the dimensional form of [N,H,W,C], the computational size (the target parameter) of each computing core in the processor is equal to the number of channels that are processed by each computing core, and when the target parameter is represented by pixel, each computing core processes channels of which the number is pixel; the total computational size of at least one computing core in the processor is equal to the product of the number of batches N, the first dimension H, and the second dimension W, i.e., the total computational size=N*H*W.

In some examples, the computational time model is also a function of the number of cycles of each computing core, and a product of the number of cycles, the target parameter, and the number of computing cores is equal to the computational size of the at least one computing core. That is, for each tensor, the computational size of the processor may be expressed by equation (1). For example, the number of cycles represents the number of rounds of computation performed per computing core, and the target parameter represents the single-core computational size in the equation (1). Based on the equation (1), the number of cycles may be expressed as a function of the target parameter when the tensor computational size and the number of computing cores are determined.

For example, for the tensor with the dimensional form of [N,H,W,C], since the smallest unit of the computational size is channel C, the tensor computational size is N*H*W; the target parameter is represented by pixel (i.e., each computing core processes channels of which the number is pixel), the number of computing cores is represented by $N_{core}$, and the number of cycles is represented by $N_{iter}$. Based on equation (1), the relationship between the number of cycles $N_{iter}$ and the target parameter pixel may be expressed as:

$$N_{iter} = (N*H*W)/(\text{pixel}*N_{core}) \quad (2)$$

In some examples, the computational time calculated based on the computational time model is positively correlated with the input time, execution time, and output time. For example, the input time $T_{WRMEM}$ represents the time for inputting the input data from an external storage to an internal storage of a computing core, the execution time $T_{RDPC}$ represents the time for actually executing the computation, and the output time $T_{RDMEM}$ represents the time for outputting the computational results from the internal storage to the external storage.

For example, a computational time model is used for an operator that includes an input tensor that inputs to one or more computing cores and an output tensor that outputs from one or more computing cores. For example, there are one or more input tensors and one or more output tensors. As an example, the operator "elew" has two input tensors and one output tensor. For example, the input time $T_{WRMEM}$ is a linear function of the target parameter pixel and a number w of the input tensor, the output time $T_{RDMEM}$ is a linear function of the target parameter pixel and a number r of the output tensor, and the execution time $T_{RDPC}$ is equal to the sum of a first offset a and the product of the target parameter pixel and a first coefficient b. The input time $T_{WRMEM}$, the output time $T_{RDMEM}$ and the execution time $T_{RDPC}$ may be expressed by the following equations (3) to (5):

$$T_{WRMEM} = w*icg*\text{pixel} \quad (3)$$

$$T_{RDMEM} = r*icg*\text{pixel} \quad (4)$$

$$T_{RDPC} = a + b*\text{pixel} \quad (5)$$

For example, the first coefficient b and the first offset a are constants related to the operator, with specific values related to the operator type, initialization instruction, and so on. For example, icg represents a constant related to the number of cycles of the input data or output data. As an example, for the tensor with the dimensional form of [N,H,W,C], when 64 numbers are input or output per cycle, the smallest unit of the computational size (i.e., channel C) is divided by 64 to get the number of cycles for processing the corresponding data, i.e., icg=C/64.

Figure 5:
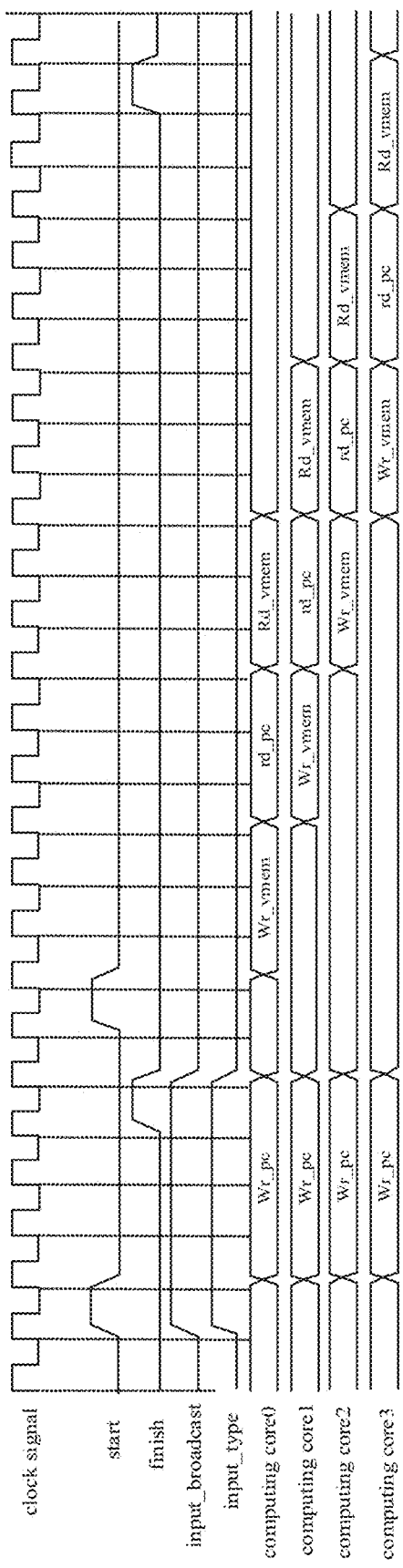
FIG. 5 is a schematic diagram of an example of the pipeline timing of a processor provided by at least one embodiment of the present disclosure.

FIG. 5 is a schematic diagram of an example of the pipeline timing of a processor provided by at least one embodiment of the present disclosure. For example, the processor in FIG. 5 is a specific example of the processor used in the data processing method in FIG. 4. Specifically, the processor in FIG. 5 may be the AI vector processor as shown in FIG. 1, or other type of processor selected according to actual needs, which are not limited in the embodiments of the present disclosure.

For example, as shown in FIG. 5, an example processor includes four computing cores (computing core 0, computing core 1, computing core 2, and computing core 3); wr_pc represents writing an instruction, that is, writing the instruction into one of the computing cores, and the time for writing the instruction is fixed; wr_vmem represents inputting data, i.e., writing the input data from an external storage unit to an internal storage of each computing core, the time for inputting the data is the input time $T_{WRMEM}$; rd_pc indicates executing computation, and the time for actually executing the computation is the execution time $T_{RDPC}$; rd_vmem represents outputting the data, that is, outputting the computational results from the internal storage to the external storage, and the time for outputting the data is the output time $T_{RDMEM}$.

For example, as shown in FIG. 5, instructions are simultaneously written into the computing cores 0 to 3, and for inputting the data, executing the computation, and outputting the data, there is a certain delay in the computing cores 0 to 3 in turn. For example, after execution of wr_vmem is completed on the computing core 0, the wr_vmem starts to be executed on the computing core 1; after execution of wr_vmem is completed on the computing core 1, the wr_vmem starts to be executed on the computing core 2; after execution of wr_vmem is completed on the computing core 2, the wr_vmem starts to be executed on the computing core 3. In other words, the delay time between the computing core 0 and the computing core 1, the delay time between the computing core 1 and the computing core 2, and the delay time between the computing core 2 and the computing core 3 are the input time $T_{WRMEM}$, respectively.

It should be noted that the example in FIG. 5 only shows the process in which the four computing cores perform one cycle calculation, respectively, while the actual number of cycles may be multiple, and the number of cycles may be determined based on equation (1) or equation (2), which are not limited in the embodiments of the present disclosure.

In some examples, the computational time model includes a first computational time model, and the first computational time model is used for a first operator. In the first computational time model, in response to traversing the target parameter to the k-th parameter, a bound type of the first operator is changed from a computing bound to a bandwidth bound.

For example, the computational time calculated based on the computational time model is positively correlated with an input time, an execution time, and an output time. For example, in response to the computational time model being the first computational time model, step S140 in FIG. 4 may further include: when the target parameter is traversed to the k-th parameter, determining the target parameter as the k-th parameter in response to a first condition being satisfied. For example, the first condition includes that a product of the input time and the number of computing cores is equal to the sum of the input time, the execution time, and the output time.

In some other examples, the computational time model includes a second computational time model, and the second computational time model is used for a second operator. In the second computational time model, a bound type of the second operator is a computing bound.

For example, the computational time calculated based on the computational time model is positively correlated with an input time, an execution time, and an output time; and in response to the computational time model being the second computational time model, the computational time T calculated based on the second computational time model may be expressed by the following equation (6):

$$T = N_{iter} * (T_{WRMEM} + T_{RDPC} + T_{RDMEM}) + T_{WRMEM} * (N_{core} - 1) \quad (6)$$

where T is the computational time calculated based on the second computational time model, $N_{iter}$ is the number of cycles of each computing core, $N_{core}$ is the number of computing cores, $T_{WRMEM}$ is the input time, $T_{RDPC}$ is the execution time, and $T_{RDMEM}$ is the output time.

For example, in response to the computational time model being the second computational time model, the "traversing the target parameter in the configuration space" in step S130 of FIG. 4 may further includes: traversing the target parameter in the configuration space in an order of the first parameter to the n-th parameter. The step S140 in FIG. 4 may further include: when the target parameter is traversed to a (k+1)-th parameter, in response to a second condition being satisfied, determining the target parameter as the k-th parameter. For example, the second condition includes that a (k+1)-th computational time obtained when the target parameter is traversed to the (k+1)-th parameter is greater than a k-th computational time obtained when the target parameter is traversed the k-th parameter.

Figures 6, 7:
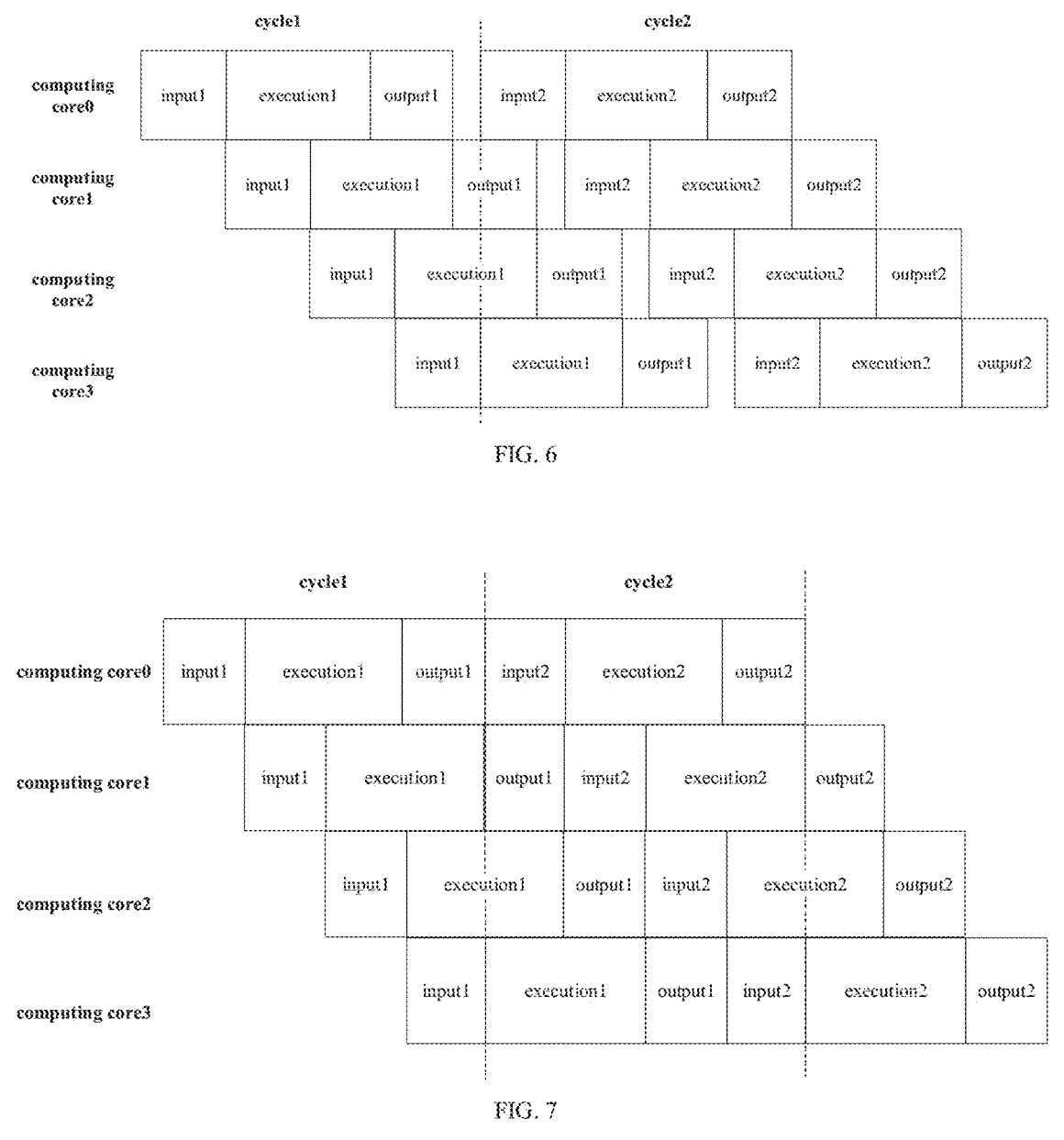
Figure 8:
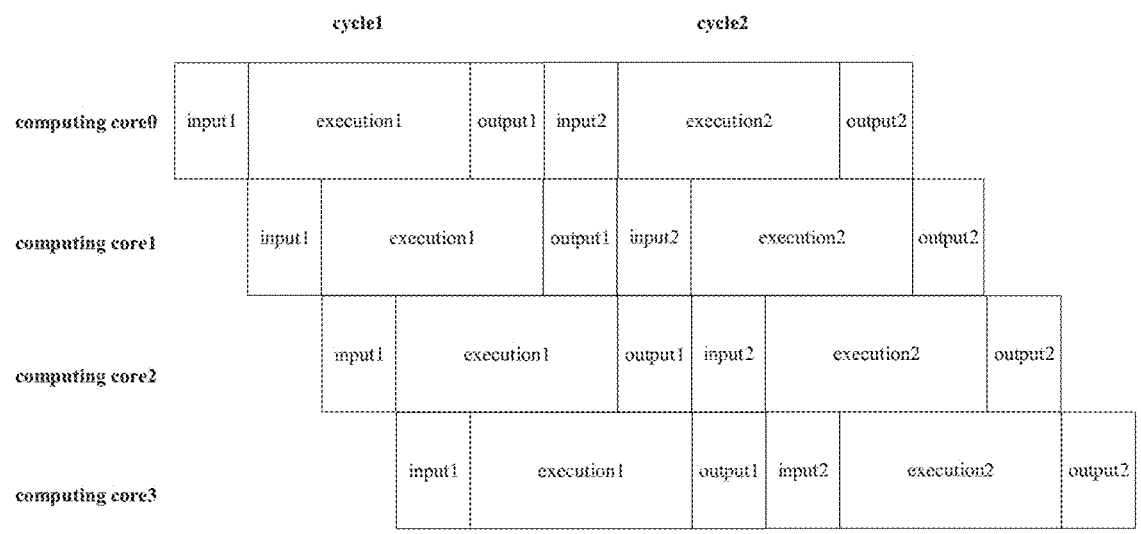
FIG. 8 is a schematic diagram of an example of a computing bound type of computing mode provided by at least one embodiment of the present disclosure.

FIG. 6 is a schematic diagram of an example of a computational mode of a bandwidth bound type provided by at least one embodiment of the present disclosure. FIG. 7 is a schematic diagram of an example of converting from a computing bound to a bandwidth bound provided by at least one embodiment of the present disclosure. FIG. 8 is a schematic diagram of an example of a computing bound type of computing mode provided by at least one embodiment of the present disclosure.

For example, the examples in FIG. 6, FIG. 7, and FIG. 8 include two cycles (cycle 1 and cycle 2), where each cycle includes the process of inputting data, executing computation, and outputting data (corresponding to the wr_vmem, rd_pc, and rd_vmem in the example in FIG. 5, respectively), and the time for inputting the data, executing the computation, and outputting the data is the input time $T_{WRMEM}$, the execution time $T_{RDPC}$, and the output time $T_{RDMEM}$, respectively.

The example of the bandwidth bound type in FIG. 6 is applicable to a first operator that is converted to the bandwidth bound type.

For example, as shown by the dotted line in FIG. 6, there is no gap between an input of cycle 1 and an input of cycle 2 for a bandwidth bound operator, i.e., after the finish of input 1 of computing core 3 in cycle 1, input 2 of computing core 0 in cycle 2 starts. Therefore, the total computational time T of an operator of the bandwidth bound type may be expressed by the following equation (7):

$$T = N_{iter} * N_{core} * T_{WRMEM} + T_{RDPC} + T_{RDMEM} \quad (7)$$

For example, referring to the example in FIG. 6, the total computational time T is equal to the time $T_{WRMEM}$ of 4 input 1 of computing cores 0-3 plus the time $T_{WRMEM}$ of 4 inputs 2, the time $T_{RDMEM}$ of execution 2, and time $T_{RDMEM}$ of output 2. That is, by substituting the number of cores $N_{core}$=4 and the number of cycles $N_{iter}$=2 into equation (7), the total computational time can be obtained as $T=2*4*T_{WRMEM}+T_{RDPC}+T_{RDMEM}$.

For example, the input time $T_{WRMEM}$, the output time $T_{RDMEM}$, and the execution time $T_{RDPC}$ are all linear functions of the target parameter pixel, which may be calculated using the above equations (3) to (5). For example, the number of cycles $N_{iter}$ is related to the target parameter pixel and the number of computing cores $N_{core}$, which may be calculated using the above equation (1) or equation (2).

For example, after substituting the equation (2) to (5) to the equation (7), the total calculation time T of an operator of the bandwidth bound type can be obtained as a function of the target parameter pixel (taking the operator "elew" with 2 input tensors and 1 output tensor as an example, i.e., w=2 and r=1):

$$T = (icg + b) * \text{pixel} + a + 2 * N * H * W * icg \qquad (8)$$

It can be seen from the equation (8) that when N, H, and W are determined, the total computational time T is a linear function of the target parameter pixel, and the total computational time T increases gradually with the increase of the target parameter pixel.

The example in FIG. 7 of converting from a computing bound to a bandwidth bound is applicable to a first operator that is just converted from the computing bound to the bandwidth bound.

For example, when the target parameter pixel is small, the bound type of the first operator is the computing bound, and as the target parameter pixel increases, the input time $T_{WRMEM}$ gradually increases, and the bound type of the first operator gradually changes to the bandwidth bound (for example, the process of gradually changing from FIG. 8 to FIG. 6).

For example, as shown in the dotted line in FIG. 7, when the first operator is just converted from the computing bound to the bandwidth bound, the computational mode of the first operator meets both a bandwidth bound condition (as shown in FIG. 6, there is no gap between the input of cycle 1 and the input of cycle 2) and the computing bound condition (as shown in FIG. 8, the output of cycle 1 is connected to the input of cycle 2). For example, when the first operator reaches a critical point in FIG. 7, the relationship between the total computational time T and the target parameter pixel meets the equations (7) and equations (8). From the equation (8), it can be seen that the total computational time T at the critical point is the smallest, and if the target parameter pixel keeps increasing, the total computational time T also keeps increasing.

For example, as shown in FIG. 7, the critical point meets the first condition, that is, the product of the input time $T_{WRMEM}$ and the number of computing cores $N_{core}$ is equal to the sum of the input time $T_{WRMEM}$, the execution time $T_{RDPC}$, and the output time $T_{RDMEM}$, and the execution time $T_{RDPC}$ and output time $T_{RDMEM}$ are the smallest, so that the total computational time T is the smallest. For example, referring to the example in FIG. 7, the first condition may be represented by the following equation (9):

$$N_{core} * T_{WRMEM} = T_{WRMEM} + T_{RDPC} + T_{RDMEM} \qquad (9)$$

From the above analysis, it can be seen that, for the first computational time model that is used for the first operator, the total computational time T is the Nike function of the target parameter pixel (for example, the total computational time T at the critical point of FIG. 7 is the smallest, and T increases when the pixel decreases or increases), so that the target parameter pixel at the critical point of FIG. 7 may be determined as the k-th parameter, and the first condition is satisfied at this time (for example, satisfying the equation (9)). Therefore, for the first computational time model, in step S140 in FIG. 4, the target parameter pixel is determined as the k-th parameter, and the bound type of the first operator is just converted from the computing bound to the bandwidth bound.

For example, furthermore, in step S150 of FIG. 4, the computational size of each computing core in the processor is configured using the determined k-th parameter, so that the optimal "single-core computational size" is obtained, and the optimal "number of cycles" may be calculated based on equation (1) or equation (2) so that the total computational time T of the processor is the smallest and the performance is optimal.

The example of the computing bound type in FIG. 8 is applicable to a second operator and a first operator that has not yet been converted to the bandwidth bound type.

For example, as shown in FIG. 8, for an operator of the computing bound type, the output of cycle 1 is concatenated with the input of cycle 2, that is, after the output 1 of cycle 1 of a computing core finishes, the input 2 of cycle 2 of the computing core starts. For example, for the computing bound operators, the computational size increases as the number of channels increases.

For example, the total computing time T of the operator of the computing bound type may be expressed by above equation (6). For example, referring to the example in FIG. 8, the number of computing cores $N_{core}=4$ and the number of cycles $N_{iter}=2$, the total computational time T is equal to the time of two cycles of computation core 3 ($T_{WRMEM}+T_{RDPC}+T_{RDMEM}$) plus the time $T_{WRMEM}$ of 3 inputs 1 of computation core 0-2, that is, $T=2*(T_{WRMEM}+T_{RDPC}+T_{RDMEM})+3*T_{WRMEM}$, thus satisfying the equation (6).

For example, substituting the equations (2) to (5), which are used for calculating the number of cycles $N_{iter}$, input time $T_{WRMEM}$, output time $T_{RDMEM}$, and execution time $T_{RDPC}$, into equation (6), the function of the total computational time T of the operator of the computing bound type with respect to the target parameter pixel can be obtained (taking the operator "elew" with 2 input tensors and 1 output tensor as an example, i.e., w=2 and r=1):

$$T = \frac{3+b}{4} * N * H * W * icg + 6 * \text{pixel} * icg + \frac{a * N * H * W}{4 * \text{pixel}} \qquad (10)$$

It can be seen from the equation (10) that when N, H, and W are determined, the total computational time T is a Nike function of the target parameter pixel; as the target parameter pixel increases, the total computational time T first increases and then decreases. For example, based on the equation (10), it can be calculated that when the target parameter pixel is set to the following value of $\text{pixel}_0$, the total computational time T is the smallest, and the processor performance is the best:

$$\text{pixel}_0 = \sqrt[2]{\frac{a * N * H * W}{24 * icg}}$$

From the above analysis, it can be seen that, for the second computational time model that is used for the second operator, the total computational time T is the Nike function of the target parameter pixel (for example, satisfying equation (6)), so that the k-th parameter may be determined as a value at or near $\text{pixel}_0$ as described above, so as to minimize the total computational time T.

However, in practical application, it is not necessary to carry out the above complex calculation every time to obtain the actual value of $\text{pixel}_0$, and the k-th parameter as described above can be found by the solution of traversing the target parameter pixel provided by the embodiments of the present disclosure. For example, in the process of traversing the target parameter pixel in the order of the first parameter to the n-th parameter, in step S140 of FIG. 4, when the target parameter pixel is traversed to the (k+1)-th parameter, if the second condition is satisfied (i.e., the (k+1)-th computational time $T_{k+1}$ corresponding to the (k+1)-th parameter is greater than the k-th computational time $T_k$ corresponding to the k-th parameter), the target parameter pixel is determined as the k-th parameter, at which point the total computational time T is the smallest (i.e., the minimum value is $T_k$).

For example, furthermore, in step S150 of FIG. 4, the computational size of each computing core in the processor is configured by using the determined k-th parameter, so that the optimal "single-core computational size" is obtained, and the optimal "number of cycles" may be calculated based on equation (1) or equation (2), so that the total computational time T of the processor is the smallest and the performance is optimal.

It should be noted that the bandwidth bound type and the computing bound type described in FIG. 6 to FIG. 8 are only illustrative, and the corresponding number of computing cores, the number of cycles, and the specific input time, execution time, and output time may also be selected according to actual needs, which are not limited in the embodiments of the present disclosure.

The data processing method provided by at least one embodiment of the present disclosure establishes an accurate computational time model based on the structure of the processor, and obtain an optimal single-core computational size according to the computational time model, without running on real hardware, thereby making full use of the processor performance, greatly improving the computing efficiency, and being applicable to different processor computing modes and different types of operators.

Figure 9:
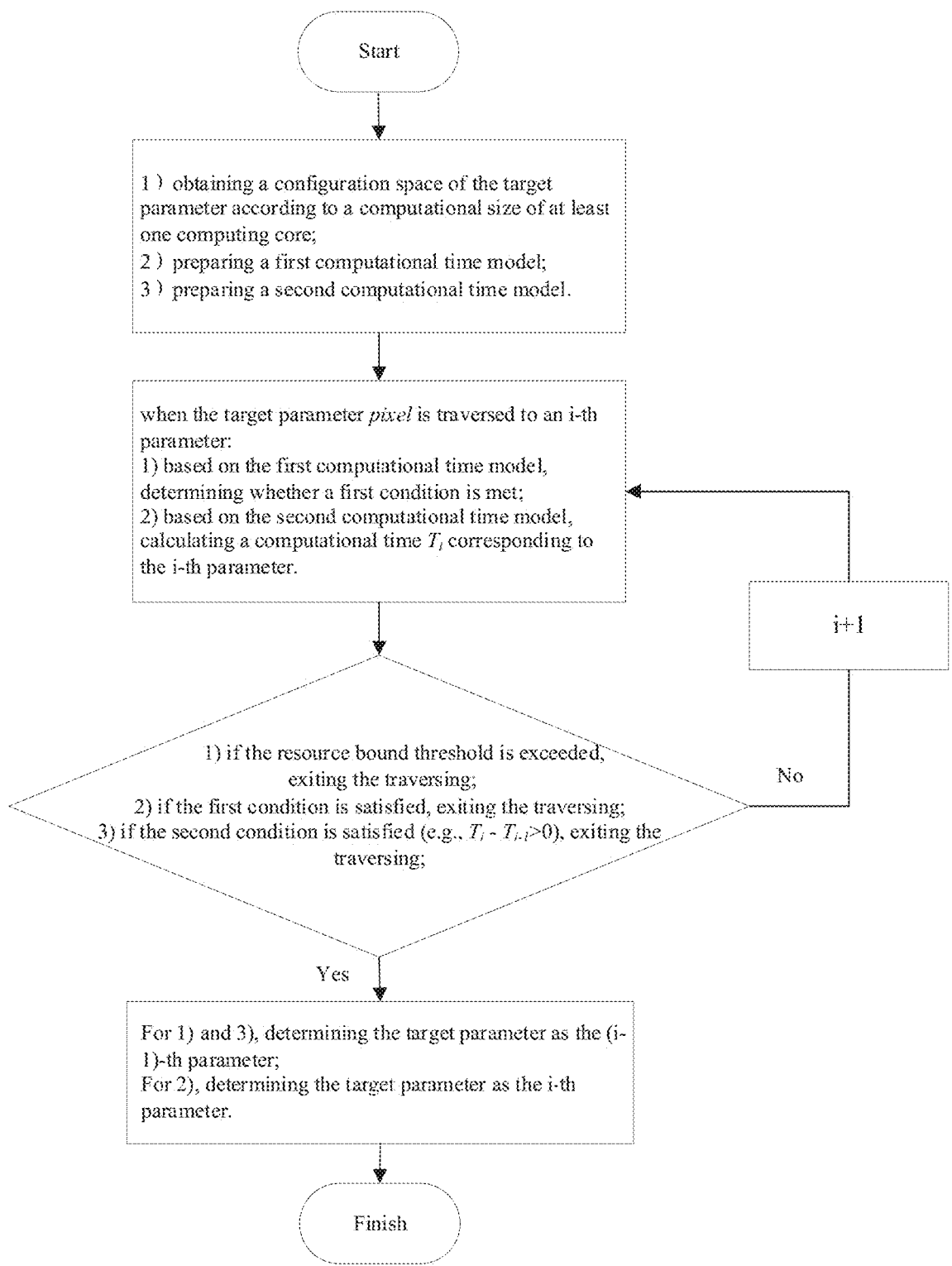
FIG. 9 is a schematic diagram of an example of the data processing method for the processor provided by at least one embodiment of the present disclosure.

FIG. 9 is a schematic diagram of an example of the data processing method for the processor provided by at least one embodiment of the present disclosure. For example, FIG. 9 shows a specific example of the data processing method for the processor in FIG. 4.

For example, as shown in FIG. 9, in an engineering application, an automatic tuning engine for parameters may be used to implement the data processing method provided by at least one embodiment of the present disclosure to obtain an optimal target parameter pixel (i.e., the k-th parameter), so as to minimize the total computing time T of the processor is minimized and optimize the processor performance.

For example, as shown in FIG. 9, after the engine receives a start instruction, in step S110 of FIG. 4, a configuration space factors<int> of the target parameter pixel is first obtained according to a computational size of at least one computing core. For example, the configuration space factors <int> includes a first parameter to an n-th parameter, where n is an integer greater than 1.

For example, furthermore, in step S120 of FIG. 4, a pre-set first computational time model and a pre-set second computational time model are prepared. For example, the first computational time model and the second computational time model are functions of the target parameter pixel and the number of computing cores of the processor $N_{core}$. For example, the first computational time model and the second computational time model shown in FIG. 9 may adopt the computational mode as described in FIG. 6 to FIG. 8, and may also adopt other computational modes according to different operator types, processor structures, or the like, which are not limited in the embodiments of the present disclosure.

For example, as shown in FIG. 9, in step S130 of FIG. 4, the target parameter pixel is traversed in the configuration space factors<int>, and in the example of FIG. 9, the target parameter pixel may be traversed in the order of the first to n-th parameters. In addition, based on the first and second computational time models, the computational time corresponding to the selected target parameter is calculated.

For example, when the target parameter pixel is traversed to an i-th parameter (where i=1, 2, ..., n), the following steps are performed:
1) based on the first computational time model, determining whether a first condition is satisfied, i.e., the product of the input time $T_{WRMEM}$ and the number of computing cores $N_{core}$ is equal to the sum of the input time $T_{WRMEM}$, the execution time $T_{RDPC}$ and the output time $T_{RDMEM}$ (for example, determining whether the equation (9) is satisfied);
2) based on the second computational time model, calculating a computational time $T_i$ corresponding to the i-th parameter to determine whether a second condition is satisfied, that is, whether the i-th computational time $T_i$ corresponding to an (i−1)-th parameter is greater than the (i−1)-th computational time $T_{i-1}$ corresponding to the (i−1)-th parameter.

For example, as shown in FIG. 9, when the target parameter pixel is traversed to the i-th parameter, it is necessary to first determine whether the computational size of the computing core exceeds the resource bound threshold of the processor, and if the resource bound threshold is exceeded, the traversing is exited, and the target parameter pixel should be determined as the (i−1)-th parameter.

For example, as shown in FIG. 9, for the first computational time model, when the target parameter pixel is traversed to the i-th parameter, without exceeding the resource bound threshold of the processor, if the first condition is satisfied (for example, equal to or just greater than the pixel inflection point satisfying the equation (9)), the traversing is exited, and the optimal target parameter pixel is determined as the i-th parameter in step S140 of FIG. 4, where the computational time $T_i$ is the minimum computational time.

For example, as shown in FIG. 9, for the second computational time model, when the target parameter pixel is traversed to the i-th parameter, without exceeding the resource bound threshold of the processor, if the second condition is satisfied (for example, $T_i - T_{i-1} > 0$ calculated using the equation (6)), the traversing is exited, and the optimal target parameter pixel is determined as an (i−1)-th parameter in step S140 of FIG. 4, where the computational time $T_{i-1}$ is the minimum computational time.

For example, as shown in FIG. 9, if none of the above three conditions are satisfied, then i+1 is performed, so that the target parameter pixel is traversed to the (i+1)-th parameter, and the above determining process is repeated.

For example, furthermore, in step S150 of FIG. 4, the computational size of each computing core in the processor is configured using the determined optimal target parameter pixel, so that the optimal "single-core computational size" is obtained, and the optimal "number of cycles" may be calculated based on equation (1) so that the total computational time of the processor is the smallest and the performance is optimal.

As an example, for an operator "elew", in the engineering application, based on a processor structure, fine modeling is performed on an ADD (addition) mode and a LOGIC_EQ (logical equality) mode of the operator "elew", respectively, by using the data processing method provided by at least one embodiment of the present disclosure, to obtain the first computational time model and the second computational time model. For example, the ADD mode is the bandwidth bound type, and the LOGIC_EQ mode is the computing bound type.

For example, as shown in Table 1, based on the computational time model obtained by the above fine modeling, the optimal value of the target parameter pixel is calculated under different dimensional forms, different bound types and different configuration spaces, and the calculated value is compared with the optimal value of pixel that is obtained by actual measurement. Furthermore, the processor performance corresponding to the optimal value of the target parameter pixel is calculated, and the obtained processor performance is compared with the processor performance corresponding to comparative empirical pixel values as selected.

parameter pixel, the data processing method provided by at least one embodiment of the present disclosure can automatically calculate the optimal pixel value for the target parameter according to the processor structure, operator mode, and the likes to improve the stability of the operator operation.

Therefore, the data processing method provided by at least one embodiment of the present disclosure establishes an accurate computational time model based on the structure of the processor, and obtain an optimal single-core computational size according to the computational time model, without running on real hardware, thereby making full use of the processor performance, greatly improving the computing efficiency, and being applicable to different processor computing modes and different types of operators.

Figure 10:
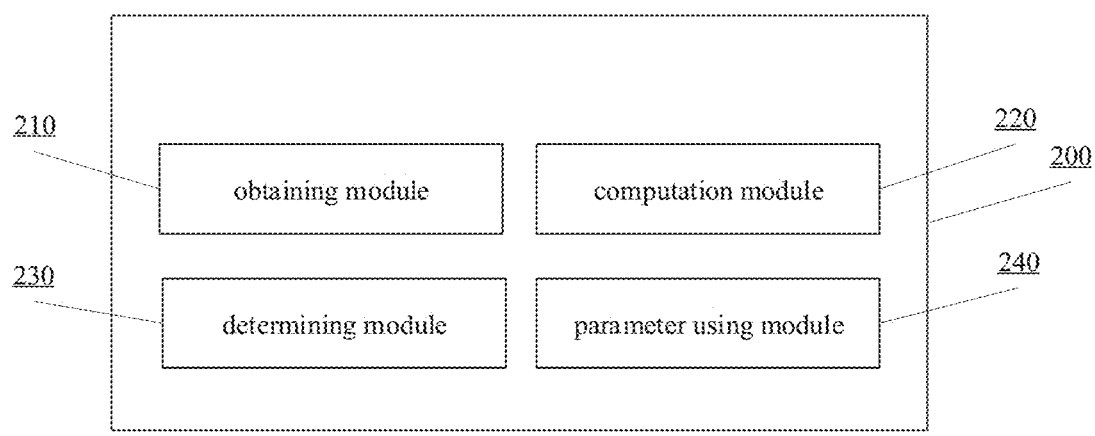
FIG. 10 is a schematic block diagram of a data processing apparatus for a processor provided by at least one embodiment of the present disclosure.

FIG. 10 is a schematic block diagram of a data processing apparatus for a processor provided by at least one embodiment of the present disclosure.

TABLE 1

Benefits of the operator "elew" in ADD mode and LOGIC_EQ mode

| Dimensional form [N, H, W, C] | pixel configuration space | Mode type | Optimal pixel value obtained by the present solution | Perform of the present solution | Performance of comparative empirical value 1 (pixel = W) | Performance of comparative empirical value 2 (pixel = W/4) | Optimal pixel value obtained by actual measurement |
|---|---|---|---|---|---|---|---|
| [1, 1, 512, 64] | 1, 2, 4, 8, 16, 32, 64, 128 | LOGIC_EQ | 16 | 4998 ns | 7663 ns | 5663 ns | 8, 16 |
|  |  | ADD | 8 | 2203 ns | 5648 ns | 2593 ns | 8 |
| [1, 1, 32, 1024] | 1, 2, 4, 8 | LOGIC_EQ | 2 | 2593 ns | 2628 ns | 2593 ns | 2 |
|  |  | ADD | 1 | 2268 ns | 3763 ns | 3113 ns | 1 |
| [1, 32, 30, 64] | 1, 2, 3, 4, 5, 6, 8, 10, 12, 15, 16, 20, 24 | LOGIC_EQ | 8 | 8183 ns | 8183 ns | 8898 ns | 8 |
|  |  | ADD | 8 | 3113 ns | 3178 ns | 3543 ns | 8, 16 |

According to the comparison results in Table 1, the total computational time calculated based on the optimal pixel value is smaller than or equal to the total computational time calculated based on the comparative empirical pixel value. In addition, the calculated optimal pixel value is basically consistent with the actual measured optimal pixel value. Therefore, a pixel value that optimizes the processor performance can be selected by calculating the target parameter pixel based on the data processing method provided by at least one embodiment of the present disclosure.

For example, for the operator "elew", 320 models were further tested. Among the 320 models using the present solution, the more than 100 models significantly improve the processor performance compared with the solution of selecting comparative empirical pixel values, in which 2 models increased the processor performance by more than 10%, and in which 30 models increased the processor performance by 2% to 4%

For example, furthermore, 320 models were also tested for the operator "activation". Among the 320 models using the present solution, more than 70 models significantly improve the processor performance compared with the solution of selecting the comparative empirical pixel value, and in which 20 models increased the processor performance by 2% to 6%.

In addition, if the comparative empirical value is selected as the target parameter pixel, when the processor structure or other conditions change, the internal storage resources of the computing cores are often insufficient. Compared with selecting the comparative empirical value as the target For example, as shown in FIG. 10, the data processing apparatus 200 for a processor includes an obtaining module 210, a computation module 220, a determining module 230 and a parameter using module 240. For example, the processor includes one or more computing cores.

For example, the obtaining module 210 is configured to obtain a configuration space for a target parameter, the configuration space includes a first parameter to an n-th parameter, where n is an integer greater than 1. For example, the obtaining module 210 is further configured to obtain a computational time model of the processor. For example, the computational time model is a function of the target parameter and number of computing cores of the processor. That is, the obtaining module 210 may be configured to execute steps S110 to S120 as shown in FIG. 4.

For example, the computation module 220 is configured to traverse the target parameter in the configuration space, and calculate, based on the computational time model, a computational time corresponding to the target parameter that is selected. That is, the computation module 220 may be configured to execute, for example, step S130 as shown in FIG. 4.

For example, the determining module 230 is configured to, in response to the target parameter being a k-th parameter with a minimum computational time, determine the target parameter as the k-th parameter, where k is a positive integer smaller than or equal to n. That is, the determining module 230 may be configured to execute, for example, step S140 as shown in FIG. 4.

For example, the parameter using module 240 is configured to use the k-th parameter to configure a computational size of each computing core in the at least one computing core. That is, the parameter using module 240 may be configured to execute, for example, step S150 as shown in FIG. 4.

For example, the computing module 220 is also configured to traverse the target parameter in the configuration space in an order of the first parameter to the n-th parameter.

For example, the determining module 230 is further configured to, in response to a computational size of the at least one computing core exceeding a resource bound threshold of the processor when the target parameter is traversed to a (k+1)-th parameter, determine the target parameter as the k-th parameter.

In some examples, the computational time model is a Nike function of the target parameter: in response to traversing the target parameter from the first parameter to the k-th parameter, a calculated computational time corresponding to the first parameter to the k-th parameter keeps decreasing; and in response to traversing the target parameter from the k-th parameter to the n-th parameter, a calculated computational time corresponding to the k-th parameter to the n-th parameter keeps increasing.

In some examples, the computational time model is a function of number of cycles of each computing core. For example, a product of the number of cycles, the target parameter, and the number of computing cores is equal to a computational size of the at least one computing core.

In some examples, the computational time model includes a first computational time model, and the first computational time model is used for a first operator. For example, in the first computational time model, in response to traversing the target parameter to the k-th parameter, a bound type of the first operator is changed from a computing bound to a bandwidth bound.

In some examples, the computational time calculated based on the computational time model is positively correlated with an input time, an execution time, and an output time. For example, in response to the computational time model being the first computational time model, the determining module 230 is further configured to, when the target parameter is traversed to the k-th parameter, determining the target parameter as the k-th parameter in response to a first condition being satisfied. For example, the first condition includes that a product of the input time and the number of computing cores is equal to the sum of the input time, the execution time, and the output time.

In some examples, the computational time model is a second computational time model, and the second computational time model is used for a second operator. For example, in the second computational time model, a bound type of the second operator is a computing bound.

In some examples, in response to the computational time model being the second computational time model, the computation module 220 is further configured to traverse the target parameter in the configuration space in an order of the first parameter to the n-th parameter. The determining module 230 is further configured to, when the target parameter is traversed to a (k+1)-th parameter, in response to a second condition being satisfied, determining the target parameter as the k-th parameter. For example, the second condition includes that a (k+1)-th computational time obtained when the target parameter is traversed to the (k+1)-th parameter is greater than a k-th computational time obtained when the target parameter is traversed the k-th parameter.

In some examples, the computational time calculated based on the computational time model is positively correlated with an input time, an execution time, and an output time, and in response to the computational time model being the second computational time model, the computational time calculated based on the second computational time model is expressed as:

$$T = N_{iter} * (T_{WRMEM} + T_{RDPC} + T_{RDMEM}) + T_{WRMEM} * (N_{core} - 1)$$

where T is the computational time calculated based on the second computational time model, $N_{iter}$ is number of cycles of each computing core, $N_{core}$ is the number of computing cores, $T_{WRMEM}$ is the input time, $T_{RDPC}$ is the execution time, and $T_{RDMEM}$ is the output time.

In some examples, the computational time calculated based on the computational time model is positively correlated with an input time, an execution time, and an output time; the computational time model is used for a first operator or a second operator, the first operator or the second operator includes at least one input tensor that inputs to the at least one computing core and at least one output tensor that outputs from the at least one computing core. For example, the input time is a linear function of the target parameter and number of the at least one input tensor, the output time is a linear function of the target parameter and number of the at least one output tensor, and the execution time is equal to the sum of a first offset and a product of the target parameter and a first coefficient, the first coefficient and the first offset are constants related to the first operator or the second operator.

In some examples, the computational time model is used for a first operator or a second operator, the first operator or the second operator includes a plurality of tensors, each tensor of the plurality of tensors includes at least one batch, data corresponding to each batch of the at least one batch includes at least one channel, and dimensions of data corresponding to each channel of the at least one channel include a first dimension and a second dimension. For example, the computational size of each computing core is equal to number of channels that are processed by each computing core, and a computational size of the at least one computing core is equal to a product of number of batches, the first dimension, and the second dimension.

Since details of what is involved in the operation of the above-described data processing apparatus 200 are described in the above description of a data processing method such as that shown in FIG. 4, which are not repeated here for the sake of brevity, and reference are made to the above description with respect to FIG. 1 to FIG. 9 for the relevant details.

It should be noted that the respective modules described above in the data processing apparatus 200 shown in FIG. 10 may be configured as software, hardware, firmware, or any combination of the above that executes specific functions, respectively. For example, the modules may correspond to a special purpose integrated circuit, or may also correspond to a pure software code, or may also correspond to circuits combining software and hardware. As an example, the apparatus described with reference to FIG. 10 may be a PC computer, a tablet apparatus, a personal digital assistant, a smart phone, a web application or other apparatus capable of executing program instructions, but is not limited thereto.

In addition, although the data processing apparatus 200 is divided into modules respectively configured to execute corresponding processing when described above, it is clear to those skilled in the art that the processing executed by respective modules may also be executed without any specific division of modules in the apparatus or any clear demarcation between the respective modules. In addition, the data processing apparatus 200 as described above with reference to FIG. 10 is not limited to including the above-described modules, but may also have some other modules (e.g., a storage module, a control module, etc.) added as required, or may also have the above-described modules combined.

At least one embodiment of the present disclosure further provides a processor that includes at least one computing core and a data processing apparatus provided by at least one embodiment of the present disclosure.

Figure 11:
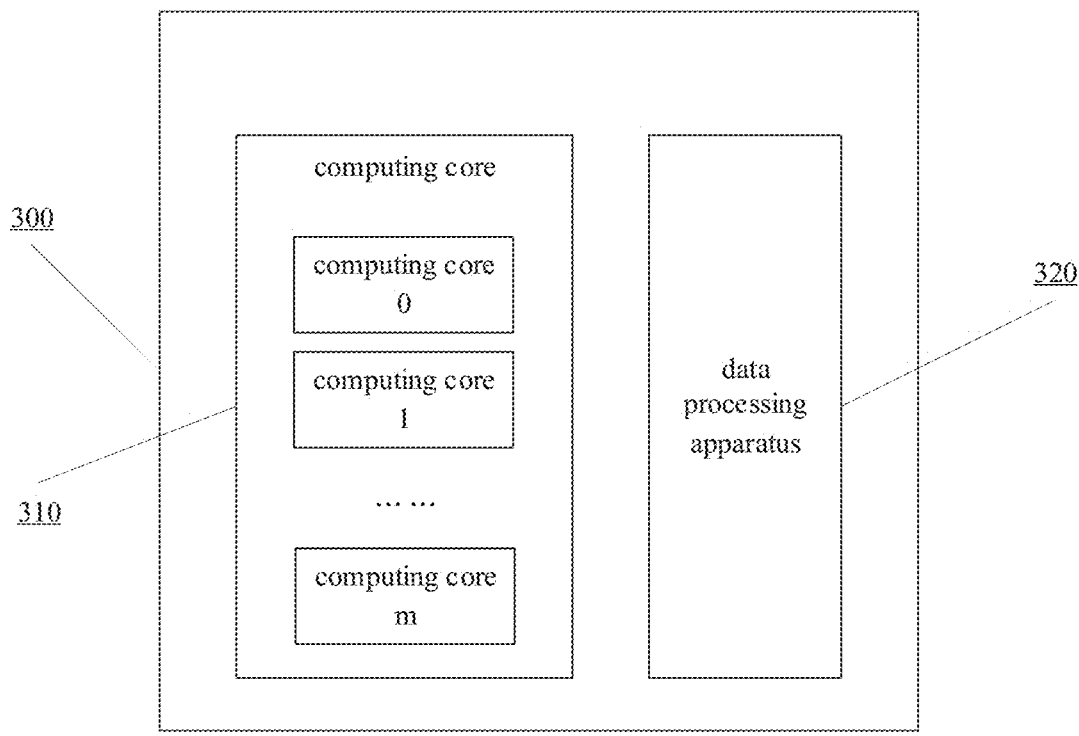
FIG. 11 is a schematic block diagram of a processor provided by at least one embodiment of the present disclosure.

FIG. 11 is a schematic block diagram of a processor provided by at least one embodiment of the present disclosure.

For example, as shown in FIG. 11, the processor 300 includes m+1 computing cores 310 (computing core 0, computing core 1, computing core 2, . . . , computing core m) and a data processing apparatus 320, where m is an integer greater than or equal to 0.

For example, an external storage apparatus may be serially accessed by m+1 computing cores 310. For example, each computing core may enable parallel processing of multiple (for example, 32, 64, or the like) group of data with a specific type (for example, int8, fp64, fp32, fp16, or the like), and each computing core can perform multiple rounds of computation to complete complex computational tasks.

For example, for an AI vector processor, the computing core 310 may be a vector processing unit therein; depending on different processor types, the computing core 310 may also be other types of processing units, which is not limited in the embodiments of the present disclosure.

For example, the data processing apparatus 320 may be a data processing apparatus provided for any embodiment of the present disclosure, and the structure and function of the data processing apparatus 320 may refer to the corresponding description of FIG. 10, which are not described again here.

At least one embodiment of the present disclosure further provides an electronic device including a processor and a memory. The memory includes one or more computer program modules; where the one or more computer program modules are stored in the memory and configured to be executed by a processor, and the one or more computer program modules include a data processing method for a processor provided by at least one embodiment of the present disclosure described above.

Figure 12:
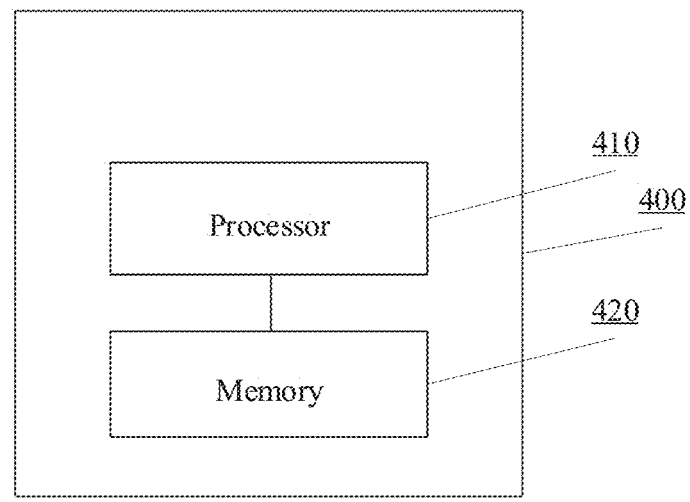
FIG. 12 is a schematic block diagram of an electronic device provided by at least one embodiment of the present disclosure.

FIG. 12 is a schematic block diagram of an electronic device provided by at least one embodiment of the present disclosure.

For example, as shown in FIG. 12, the electronic device 400 includes a processor 410 and a memory 420. For example, memory 420 is configured to store non-transitory computer-readable instructions (e.g., one or more computer program modules). The processor 410 is configured to execute non-transitory computer-readable instructions; and when executed by the processor 410, the non-transitory computer-readable instructions may implement one or more steps of the data processing method as described above. The memory 420 and the processor 410 may be interconnected by a bus system and/or other form of connection mechanism (not shown).

For example, the processor 410 may be a digital signal processor (DSP) or other form of processing unit with data processing capability and/or program execution capability, such as an X86, an ARM architecture, a Field Programmable Gate Array (FPGA) or the like. The processor 410 may be a general-purpose processor or a special purpose processor, and may control other components in the electronic device 400 to perform the desired functions.

For example, memory 420 may include any combination of one or more computer program products; and the computer program products may include various forms of computer readable storage media, for example, a volatile memory and/or a non-volatile memory. The volatile memory may include, for example, a Random-Access Memory (RAM) and/or a cache, or the like. The non-volatile memory may include, for example, a Read Only Memory (ROM), a hard disk, an Erasable Programmable Read Only Memory (EPROM), a Portable Compact Disk Read Only Memory (CD-ROM), a USB memory, a flash memory, or the like. One or more computer program modules may be stored on the computer readable storage medium, and the processor 410 may run the computer programs, to implement various functions of the electronic device 400. Various applications and various data, as well as various data used and/or generated by the applications may also be stored on the computer readable storage medium.

It should be noted that specific functions and technical effects of the electronic device 400 in the embodiments of the present disclosure may refer to the above description of the data processing method provided by at least one embodiment of the present disclosure, which are not repeated here.

Figure 13:
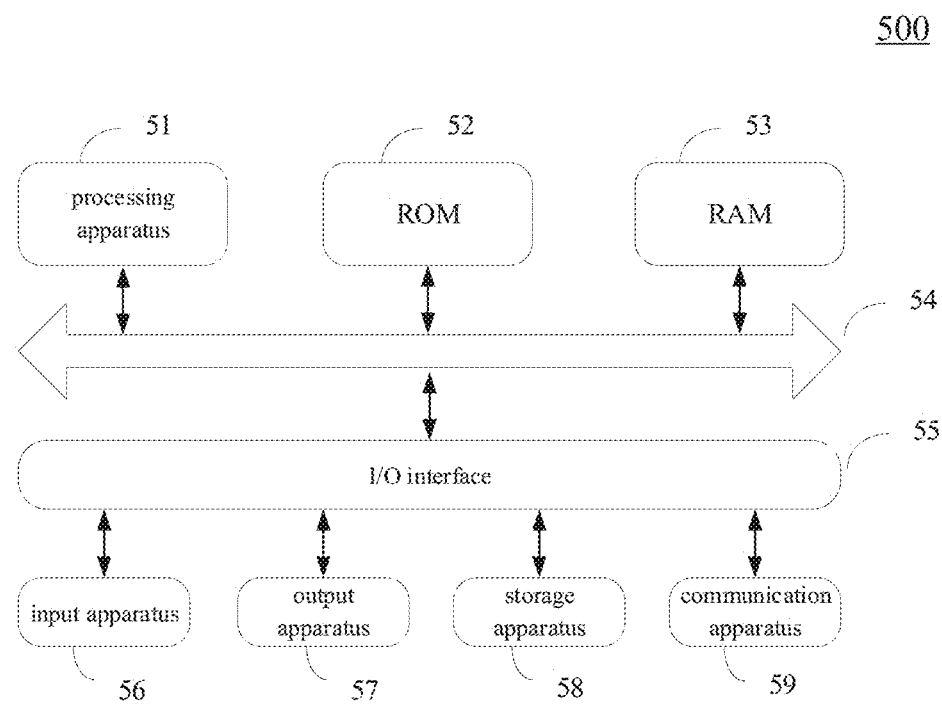
FIG. 13 is a schematic block diagram of another electronic device provided by at least one embodiment of the present disclosure.

FIG. 13 is a schematic block diagram of another electronic device provided by at least one embodiment of the present disclosure.

For example, as shown in FIG. 13, the electronic device 500 is, for example, suitable for implementing the data processing method provided by embodiments of the present disclosure. It should be noted that the electronic device 500 shown in FIG. 13 is only an example, which does not impose any bound on the function and scope of use of the embodiments of the present disclosure.

For example, as shown in FIG. 13, an electronic device 500 may include a processing apparatus (e.g., a central processing unit, a graphics processor, etc.) 51 that may execute various appropriate actions and processing according to a program stored in a Read-Only Memory (ROM) 52 or a program loaded from a storage apparatus 58 into a Random-Access Memory (RAM) 53. The RAM 53 further stores various programs and data required for operation of the electronic device 500. The processing apparatus 51, the ROM 52 and the RAM 53 are connected to each other through a bus 54. An input/output (I/O) interface 55 is also connected to the bus 54. In general, the following apparatuses may be connected to the I/O interface 55: an input apparatus 56 including, for example, a touch screen, a touch pad, a keyboard, a mouse, a camera, a microphone, an accelerometer, a gyroscope, etc.; an output apparatus 57 including, for example, a Liquid Crystal Display (LCD), a speaker, a vibrator, etc.; a storage apparatus 58 including, for example, a magnetic tape, a hard disk, etc.; and a communication apparatus 59. The communication apparatus 59 may allow the electronic device 500 to perform wireless or wired communication with other electronic device so as to exchange data.

Although FIG. 13 illustrates electronic device 500 with various apparatuses, it should be understood that it is not required to implement or have all the apparatuses shown, and electronic device 500 may alternatively be implemented or provided with more or fewer apparatuses.

It should be noted that not all of the components of the electronic device 400/500 are shown for clarity and conciseness in the present disclosure. To realize the necessary functions of the electronic device, those skilled in the art may provide, set other constituent units not shown according to specific needs, which are not limited by embodiments of the present disclosure.

Regarding the detailed explanation and technical effects of the electronic device 400/500, reference may be made to the above related description regarding the data processing method, which is not repeated here.

Figure 14:
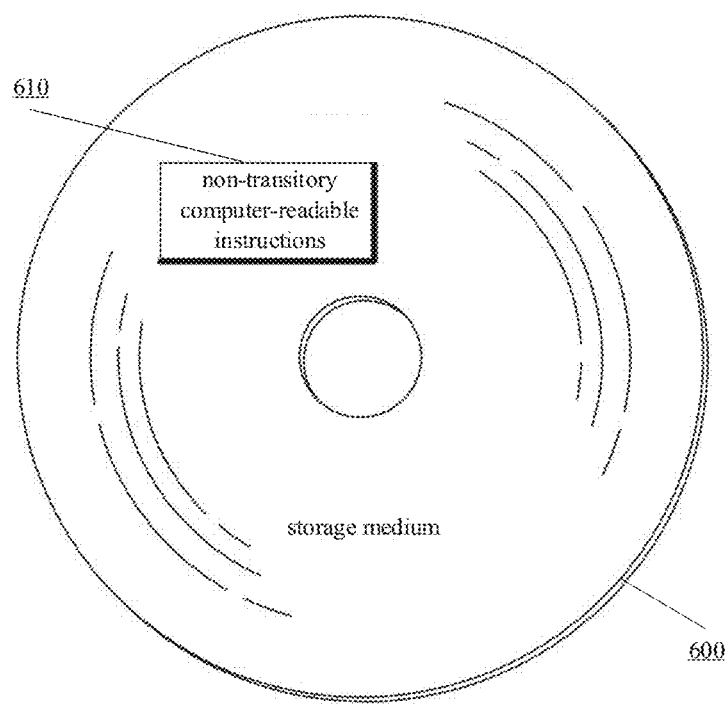
FIG. 14 is a schematic diagram of a storage medium provided by at least one embodiment of the present disclosure.

FIG. 14 is a schematic diagram of a storage medium provided by at least one embodiment of the present disclosure.

For example, as shown in FIG. 14, the storage medium 600 is configured to store non-transitory computer-readable instructions 610. For example, the non-transitory computer-readable instructions 610, when executed by a computer, may implement one or more steps in the data processing method as described above.

This storage medium 600 may be applied to the electronic device 400 as shown in FIG. 12. For example, the storage medium 600 may be the memory 420 in the electronic device 400. For example, the relevant description of the storage medium 600 may refer to the corresponding description of the memory 420 in the electronic device 400 as shown in FIG. 12, and no details will be repeated here.

The following points need to be noted:

(1) In the drawings of the embodiments of the present disclosure, only the structures related to the embodiments of the present disclosure are involved, and other structures may refer to the common design(s).

(2) In case of no conflict, features in one embodiment or in different embodiments of the present disclosure may be combined.

The above are merely particular embodiments of the present disclosure but are not limitative to the scope of the present disclosure; any of those skilled familiar with the related arts may easily conceive variations and substitutions in the technical scopes disclosed by the present disclosure, which should be encompassed in protection scopes of the present disclosure. Therefore, the scopes of the present disclosure should be defined in the appended claims.

The invention claimed is:

1. A method for improving computing efficiency of a processor by optimizing a computational size of each computing core in the processor, wherein the processor comprises at least one computing core, the method comprises:
 obtaining a configuration space for a target parameter, wherein the configuration space comprises a first parameter to an n-th parameter, and n is an integer greater than 1;
 obtaining a computational time model of the processor, wherein the computational time model is a function of the target parameter and a number of computing cores of the processor;
 traversing the target parameter in the configuration space, and calculating, by utilizing the computational time model, a computational time corresponding to the target parameter that is selected among the parameters in the configuration space, wherein the computational time is positively correlated with an input time, an execution time, and an output time;
 in response to the target parameter being a k-th parameter with a minimum computational time of the processor, determining the target parameter as the k-th parameter, wherein k is a positive integer smaller than or equal to n;
 improving the computing efficiency of the processor by configuring the computational size of each computing core in the processor based on the k-th parameter; and
 wherein in response to the computational time model being the first computational time model, the determining the target parameter as the k-th parameter comprises:
 determining the target parameter as the k-th parameter in response to a first condition being satisfied when the target parameter is traversed to the k-th parameter, wherein the first condition comprises that a product of the input time and the number of computing cores is equal to a sum of the input time, the execution time, and the output time.

2. The data processing method according to claim 1, wherein traversing the target parameter in the configuration space comprises:
 traversing the target parameter in the configuration space in an order of the first parameter to the n-th parameter.

3. The data processing method according to claim 2, further comprising:
 in response to a computational size of the at least one computing core exceeding a resource bound threshold of the processor when the target parameter is traversed to a (k+1)-th parameter, determining the target parameter as the k-th parameter.

4. The data processing method according to claim 2, wherein the computational time model is a Nike function of the target parameter,
 in response to traversing the target parameter from the first parameter to the k-th parameter, a calculated computational time corresponding to the first parameter to the k-th parameter keeps decreasing, and
 in response to traversing the target parameter from the k-th parameter to the n-th parameter, a calculated computational time corresponding to the k-th parameter to the n-th parameter keeps increasing.

5. The data processing method according to claim 1, wherein the computational time model is a function of number of cycles of each computing core,
 a product of the number of cycles, the target parameter, and the number of computing cores is equal to a computational size of the at least one computing core.

6. The data processing method according to claim 1, wherein the first computational time model is used for a first operator,
 in the first computational time model, in response to traversing the target parameter to the k-th parameter, a bound type of the first operator is changed from a computing bound to a bandwidth bound.

7. The data processing method according to claim 1, wherein the computational time model is a second computational time model, and the second computational time model is used for a second operator,
 in the second computational time model, a bound type of the second operator is a computing bound.

8. The data processing method according to claim 7, wherein in response to the computational time model being the second computational time model:
 traversing the target parameter in the configuration space comprises:
 traversing the target parameter in the configuration space in an order of the first parameter to the n-th parameter;
 in response to the target parameter being the k-th parameter with the minimum computational time, determining the target parameter as the k-th parameter, comprises:

when the target parameter is traversed to a (k+1)-th parameter, in response to a second condition being satisfied, determining the target parameter as the k-th parameter, wherein the second condition comprises that a (k+1)-th computational time obtained when the target parameter is traversed to the (k+1)-th parameter is greater than a k-th computational time obtained when the target parameter is traversed the k-th parameter.

9. The data processing method according to claim 7, in response to the computational time model being the second computational time model, the computational time calculated based on the second computational time model is expressed as:

$$T=N_{iter}*(T_{WRMEM}+T_{RDPC}+T_{RDMEM})+T_{WRMEM}*(N_{core}-1)$$

wherein T is the computational time calculated based on the second computational time model, $N_{iter}$ is number of cycles of each computing core, $N_{core}$ is the number of computing cores, $T_{WRMEM}$ is the input time, $T_{RDPC}$ is the execution time, and $T_{RDMEM}$ is the output time.

10. The data processing method according to claim 1, wherein
the computational time model is used for a first operator or a second operator, the first operator or the second operator comprises at least one input tensor that inputs to the at least one computing core and at least one output tensor that outputs from the at least one computing core,
the input time is a linear function of the target parameter and number of the at least one input tensor,
the output time is a linear function of the target parameter and number of the at least one output tensor, and
the execution time is equal to the sum of a first offset and a product of the target parameter and a first coefficient, wherein the first coefficient and the first offset are constants related to the first operator or the second operator.

11. The data processing method according to claim 1, wherein the computational time model is used for a first operator or a second operator, wherein the first operator or the second operator comprises a plurality of tensors, each tensor of the plurality of tensors comprises at least one batch, data corresponding to each batch of the at least one batch comprises at least one channel, and dimensions of data corresponding to each channel of the at least one channel comprise a first dimension and a second dimension,
the computational size of each computing core is equal to number of channels that are processed by each computing core, and
a computational size of the at least one computing core is equal to a product of number of batches, the first dimension, and the second dimension.

12. A processor, comprising:
at least one computing core; and
a data processing apparatus, configured to implement:
obtaining a configuration space for a target parameter, wherein the configuration space comprises a first parameter to an n-th parameter, and n is an integer greater than 1;
obtaining a computational time model of the processor, wherein the computational time model is a function of the target parameter and a number of computing cores of the processor;
traversing the target parameter in the configuration space, and calculating, by utilizing the computational time model, a computational time corresponding to the target parameter that is selected among the parameters in the configuration space, wherein the computational time is positively correlated with an input time, an execution time, and an output time;
in response to the target parameter being a k-th parameter with a minimum computational time of the processor, determining the target parameter as the k-th parameter, wherein k is a positive integer smaller than or equal to n;
improving computing efficiency of the processor by configuring a computational size of each computing core in the processor based on the k-th parameter; and
wherein in response to the computational time model being the first computational time model, the determining the target parameter as the k-th parameter comprises:
determining the target parameter as the k-th parameter in response to a first condition being satisfied when the target parameter is traversed to the k-th parameter, wherein the first condition comprises that a product of the input time and the number of computing cores is equal to a sum of the input time, the execution time, and the output time.

13. An electronic device, comprising:
a processor comprising at least one computing core; and
a memory comprising one or more computer program modules, wherein the one or more computer program modules are stored in the memory and configured to be executed by the processor, and the one or more computer program modules are configured to implement:
obtaining a configuration space for a target parameter, wherein the configuration space comprises a first parameter to an n-th parameter, and n is an integer greater than 1;
obtaining a computational time model of the processor, wherein the computational time model is a function of the target parameter and a number of computing cores of the processor;
traversing the target parameter in the configuration space, and calculating, by utilizing the computational time model, a computational time corresponding to the target parameter that is selected among the parameters in the configuration space, wherein the computational time is positively correlated with an input time, an execution time, and an output time;
in response to the target parameter being a k-th parameter with a minimum computational time of the processor, determining the target parameter as the k-th parameter, wherein k is a positive integer smaller than or equal to n;
improving computing efficiency of the processor by configuring a computational size of each computing core in the processor based on the k-th parameter; and
wherein in response to the computational time model being the first computational time model, the determining the target parameter as the k-th parameter comprises:
determining the target parameter as the k-th parameter in response to a first condition being satisfied when the target parameter is traversed to the k-th parameter, wherein the first condition comprises that a product of the input time and the number of computing cores is equal to a sum of the input time, the execution time, and the output time.

14. The electronic device according to claim 13, wherein traversing the target parameter in the configuration space comprises:

traversing the target parameter in the configuration space in an order of the first parameter to the n-th parameter.

15. The electronic device according to claim 14, the one or more computer program modules are further configured to implement:

in response to a computational size of the at least one computing core exceeding a resource bound threshold of the processor when the target parameter is traversed to a (k+1)-th parameter, determining the target parameter as the k-th parameter.

16. The electronic device according to claim 14, wherein the computational time model is a Nike function of the target parameter, in response to traversing the target parameter from the first parameter to the k-th parameter, a calculated computational time corresponding to the first parameter to the k-th parameter keeps decreasing, and in response to traversing the target parameter from the k-th parameter to the n-th parameter, a calculated computational time corresponding to the k-th parameter to the n-th parameter keeps increasing.

17. The electronic device according to claim 13, wherein the computational time model is a function of number of cycles of each computing core, a product of the number of cycles, the target parameter, and the number of computing cores is equal to a computational size of the at least one computing core.

18. The electronic device according to claim 13, wherein the first computational time model is used for a first operator, in the first computational time model, in response to traversing the target parameter to the k-th parameter, a bound type of the first operator is changed from a computing bound to a bandwidth bound.

19. A non-transitory storage medium, on which computer-readable instructions are stored, wherein the computer-readable instructions, when executed by a computer, implement the method according to claim 1.

* * * * *